United States Patent Office 3,335,199
Patented Aug. 8, 1967

3,335,199
OLEFIN POLYMERIZATION PROCESS
William P. Griffin, Jr., Wilmington, Del., and Richard S. Stearns, Malvern, Pa., assignors to Sun Oil Company, Philadelphia, Pa., a corporation of New Jersey
No Drawing. Filed June 6, 1966, Ser. No. 555,285
5 Claims. (Cl. 260—683.15)

This application is a continuation-in-part of our application Ser. No. 191,413, filed May 1, 1962 and now abandoned.

This invention relates to the polymerization of 1-olefins to low molecular weight liquid 1-olefin polymers. In particular, it relates to a novel catalyst pretreatment step for increasing the yield of low molecular weight liquid 1-olefin polymers in a polymerization process for preparing the latter.

It is well known in the art to polymerize 1-olefins to higher molecular weight polymers such as solid polyethylene and solid polypropylene. Highly viscous, tacky, adhesive-like polymers and liquid low molecular weight internal olefins such as butene-2 have also been prepared. In such polymerization reactions, the use of a catalyst is essential for several reasons. A catalyst often increases the speed of the reaction. In addition, a catalyst often reduces the temperature required to initiate the polymerization, thus reducing the number of different polymers formed. A catalyst also frequently increases the yield of polymer products. Many catalysts have been suggested for use in polymerizing 1-olefins, such as ethylene and propylene, to high molecular weight solid or viscous polymers.

It is also desirable to convert 1-olefins, such as ethylene and propylene, to other low molecular weight 1-olefins, such as butene-1 and hexene-1. Such products have a variety of uses. Butene-1 is useful in the preparation of butadiene rubber polymers and both butene-1 and hexene-1 are useful in the preparation of polymer gasolines.

Conventional 1-olefin polymerization catalysts are not suitable for the preparation of low molecular weight 1-olefins. For example, chromium oxide is a very active olefin polymerization catalyst, but it is mainly useful in the preparation of solid polymers. Chromium oxide is generally an unsatisfactory catalyst for preparing low molecular weight liquid 1-olefin polymers. Nickel oxide has been used as a catalyst to polymerize ethylene to butene and hexene, but a reaction temperature on the order of 150–200° C. is necessary. At this temperature any butene-1 and hexene-1 are isomerized to the more stable internal isomers, butene-2 and hexene-2. Where the preparation of butene-1 or hexene-1 is desired, nickel oxide is therefore an unsatisfactory catalyst. A mixture of chromium oxide and nickel oxide has also been used as an olefin polymerization catalyst. If the chromium oxide content predominates, said polymer is usually formed. If the nickel oxide content predominates, liquid internal olefins are formed.

It has now been discovered that if a chromium oxide-nickel oxide supported catalyst is pretreated in a certain manner, the catalyzing ability is modified so that low molecular weight 1-olefins can thereafter be prepared in substantially higher yield than can otherwise be obtained. Thus ethylene is polymerized to butene-1 and hexene-1, propylene is polymerized to 2-methyl-1-pentene, and mixtures of 1-olefins are converted to 1-olefin polymers in substantially higher yield. The catalyst pretreatment is accomplished by contacting a chromium oxide-nickel oxide catalyst with ethylene under essentially nonpolymerizing conditions, i.e., conditions at which a polymer product is not obtained, of a temperature in the range of 100 to 325° C. and a pressure in the range of 0.1 to 25 p.s.i.a.

The chromium oxide-nickel oxide olefin polymerization catalysts comprise chromium oxide in combination with nickel oxide on a support which is preferably silica-alumina. The mol ratio of nickel to chromium should be in the range of .1:1 to 30:1, preferably .1:1 to 1:1 for the preparation of solid polymer products and 1:1 to 30:1 for the preparation of liquid internal olefin products. The total amount of metal oxides should be in the range of .1 to 20 percent based on total catalyst weight. At least .1 percent of the total catalyst weight should be hexavalent chromium. As used herein, total catalyst weight is the weight of the metal oxides and the support.

In a specific embodiment of the present invention a catalyst comprising a mixture of the oxides of chromium and nickel, on a support of silica-alumina, is non-polymerizably contacted with ethylene at a temperature in the range of 100 to 325° C., and at a pressure in the range of .01 to 25 p.s.i.a. The catalyst is then contacted with ethylene under polymerizing conditions to polymerize the ethylene to low molecular weight 1-olefin polymers. The polymerizing conditions include a temperature in the range of 25 to 125° C. and a pressure in the range of 10 to 100 atmospheres. It will then be found that the reaction products consist of a substantially higher amount of butene-1 and hexene-1 than is obtained without the pretreatment step. Only a minor amount of solid polymer is formed.

The temperature at which the pretreatment is carried out is an important phase of the pretreatment. While a temperature in the range of 100 to 325° C. is satisfactory, it has been found that when the initial contact of the ethylene with the catalyst is at a temperature in the range of 150 to 250° C. the subsequent polymerization will give a maximum amount of liquid 1-olefins, e.g., when ethylene is polymerized, a maximum amount of butene-1 and hexene-1 are formed. More preferably the temperature is about 200° C.

If the catalyst pretreatment is carried out at a temperature below the indicated range of 100 to 325° C., there is apparently no change in catalyst activity, for the polymerization products will be substantially the same as when the pretreatment step is omitted. For example, if a mixture of chromium oxide and nickel oxide, in which the chromium oxide predominates, is pretreated at 60° C., the subsequent polymerization products will be mostly solid polymers.

Similarly, if the polymerization catalyst is pretreated by contact with ethylene at a temperature higher than that indicated, the polymerization products will not be liquid 1-olefins.

The pressure at which the ethylene is contacted with the catalyst to effect the pretreatment is important in order to avoid formation of polymer products during the pretreating step. The pressure at which the pretreatment of the present invention can be carried out can vary considerably, but the pressure must be such that, in combination with the selected temperature, extensive polymerization does not occur.

The beneficial effect of the pretreatment apparently occurs almost immediately upon contact of ethylene with the catalyst, since it has been found that the ultimate polymer products are the same for a pretreatment of 30–60 seconds as for a pretreatment of as long as 24 hours. The ethylene used in the pretreatment step can be the normal commercial grade which normally has a purity in excess of 99.5%, usually above 99.9%.

The conditions of polymerization following the catalyst pretreatment can vary over a wide range. The 1-olefin to be polymerized should contain 2–8 carbon atoms, preferably 3–8, more preferably 3–4, and the exact conditions employed will depend upon the specific 1-olefin being polymerized. The conditions of temperature and pressure for polymerizing such 1-olefins to low molecular weight 1-olefin polymers are known in the art but will include a temperature in the range of 25 to 125° C. and a pressure in the range of 10 to 100 atmospheres. It is usually desirable to maintain the temperature sufficiently low so that no appreciable thermal isomerization of the 1-olefin products occur. The liquid low molecular weight 1-olefin polymer products will normally have a molecular weight of 56–336, more frequently 56–224.

The pretreatment of the catalyst and subsequent polymerization of the 1-olefin can be carried out either as a batch-wise operation or as a continuous operation. Similarly, the process can be carried out with a fixed catalyst bed or with a moving catalyst bed. In addition, a solvent or diluent may be employed but the invention may if desired be practiced in the absence of a solvent or any other hydrocarbons. The use of a solvent, such as pentane or hexane, is often desirable in order to prevent the deposition of any solid polymer on the catalyst surface thereby reducing catalyst life.

The material used as a support for the catalyst can be any of several known in the art to be satisfactory olefin polymerization catalyst supports. A preferred support is silica-alumina containing a major amount of silica, preferably about 90 percent. Silica, alumina, activated clay, kieselguhr, charcoal and the like have also been used as catalyst supports. Numerous methods for preparing such supports have been described in the prior art.

The methods of impregnating the support with the catalytically active material have also been thoroughly discussed in the prior art. The methods often include such steps as contacting the support with a solution of salts of the metal or metals to be used, removal of excess liquid, drying of the solid catalyst, followed by activation of the catalyst. Preparation of a silica-alumina supported chromium oxide-nickel oxide catalyst is described in detail in U.S. Patent No. 2,969,348.

It is also known that the olefin polymerization activity of a catalyst containing chromium oxide is enhanced if at least some of the chromium, at least .1 percent of the total catalyst weight, is present as hexavalent chromium. The presence of hexavalent chromium does not affect the pretreatment process of the present invention.

The following examples specifically illustrate the benefit derived by pretreating chromium oxide-nickel oxide polymerization catalysts in accordance with the present invention. All percentages stated are expressed on a weight basis.

EXAMPLE I

A chromium oxide-nickel oxide catalyst on a support of silica-alumina and containing 2% NiO, 0.2% $CrO_3$, 10% $Al_2O_3$, and 87.8% $SiO_2$ (mol ratio nickel to chromium=13.4) was contacted with ethylene under polymerizing conditions consisting of a temperature of 100° C. and a pressure of 40 atmospheres. The polymer product obtained consisted of 13.6% butene-1 and hexene-1, 72.1% butene-2 and hexene-2, and 14.3% higher molecular weight products.

EXAMPLE II

The catalyst of Example I was pretreated by contacting the catalyst with ethylene at a temperature of 100° C. and a pressure of 15 p.s.i.a. The pretreated catalyst was then contacted with ethylene under the same polymerizing conditions as in Example I, 100° C. temperature and 40 atmospheres pressure. The polymer product obtained consisted of 24.3% butene-1 and hexene-1 and 75.7% butene-2 and hexene-2. No higher molecular weight products were formed.

EXAMPLE III

The procedure was the same as in Example II except that the pretreatment temperature was 200° C. The polymer product obtained consisted of 67% butene-1 and hexene-1 and 33% butene-2 and hexene-2. No higher molecular weight products were formed.

EXAMPLE IV

The procedure was the same as in Example II except that the pretreatment temperature was 300° C. The polymer product obtaind consisted of 55.2% butene-1 and hexene-1 and 44.8% butene-2 and hexene-2. No higher molecular weight products were formed.

The foregoing experiments utilized a catalyst in which the mol ratio of nickel to chromium was 13.4:1. When other mol ratios within the range of .1:1 to 30:1 are used substantially the same results are obtained. That is, there is a distinct increase in the amount of low molecular weight 1-olefin products formed. Likewise, when other 1-olefins containing 2 to 8 carbon atoms, such as propylene and hexene-1, are polymerized in the presence of the pretreated catalyst there is a distinct increase in the amount of low molecular weight 1-olefin products formed. In most cases the amount of low molecular weight 1-olefin products formed is greater than 50% by weight of all products formed.

The invention claimed is:

1. A process for polymerizing 1-olefins which comprises non-polymerizably contacting a catalyst comprising chromium oxide and nickel oxide supported on a carrier with ethylene at a temperature in the range of 150 to 250° C. and a pressure in the range of .01 to 25 p.s.i.a. and subsequently polymerizing a 1-olefin having 2 to 8 carbon atoms with said catalyst at a temperature in the range of 25 to 125° C. and a pressure in the range of 10 to 100 atmospheres to form a liquid polymer of said 1-olefin having a molecular weight of 56–336, said liquid polymer being more than 50% by weight of all products formed.

2. Process according to claim 1 wherein at least .1 percent of the total catalyst weight is hexavalent chromium.

3. Process according to claim 1 wherein the 1-olefin is ethylene.

4. Process according to claim 1 carried out in the absence of a solvent.

5. Process according to claim 1 wherein the 1-olefin contains 3–4 carbon atoms.

References Cited

UNITED STATES PATENTS

| | | | |
|---|---|---|---|
| 2,825,721 | 3/1958 | Hogan et al. | 260—683.15 X |
| 2,929,348 | 1/1961 | Fawcett | 252—459 X |
| 3,235,508 | 2/1966 | Mills | 260—683.15 X |

PAUL M. COUGHLAN, JR., *Primary Examiner.*